A. MASSON.
ROTARY STEAM ENGINE.
No. 12,726. Patented Apr. 17, 1855.
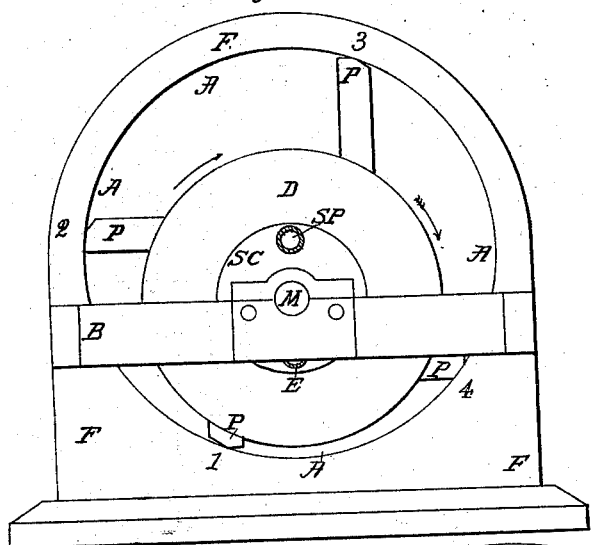
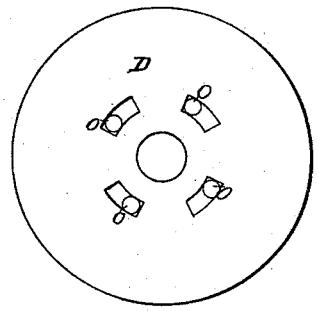
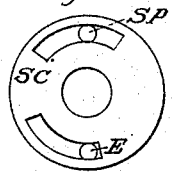
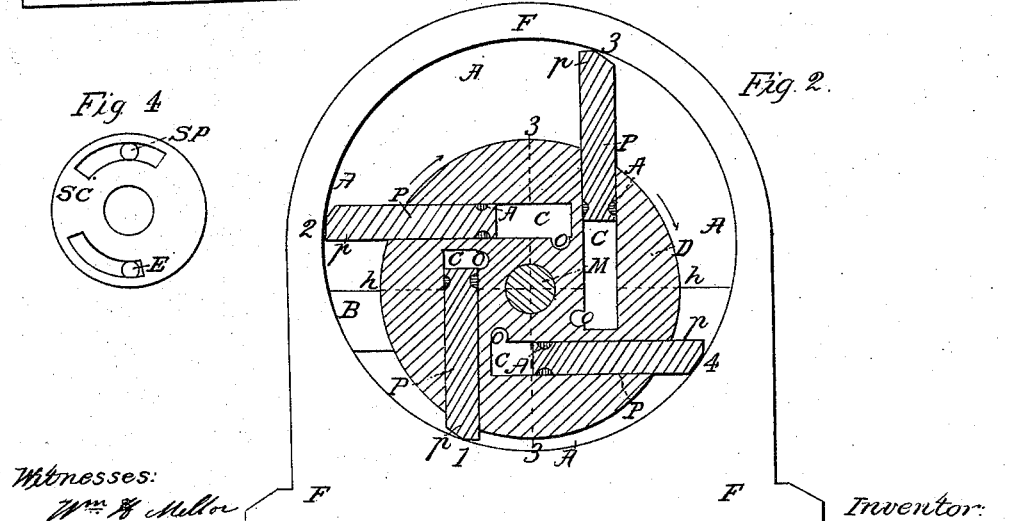

UNITED STATES PATENT OFFICE.

ABRAHAM MASSON, OF PHILADELPHIA, PENNSYLVANIA.

ROTARY ENGINE.

Specification of Letters Patent No. 12,726, dated April 17, 1855.

*To all whom it may concern:*

Be it known that I, ABRAHAM MASSON, of the city of Philadelphia and State of Pennsylvania, have invented a new and useful Improvement in Rotary Steam-Engines; and I do hereby declare the following to be a full and exact description of the same, reference being had to the annexed drawings, in which—

Figure 1 represents a side view or elevation of my improved engine. Fig. 2 a vertical section of the same. Fig. 3 represents a side view of a disk or hub D detached. Fig. 4 a view of steam plate detached.

The nature of my improvement consists in attaching four steam cylinders to a disk or hub in tangential directions and surrounding the disk with a covered guide which restrains the ends of the piston rods and causes the pressure to be exerted by the steam against the base of each cylinder and to operate as a motive power to rotate the central disk or hub.

F F is a stout curved guide made of cast iron or other suitable material with a space A A A A turned or filed out so as to present a smooth inner surface.

D D is a solid metallic disk or hub revolving on an axle M, the position of which axle M will be hereafter described.

C C C C are four steam cylinders precisely alike bored into the disk D D or firmly fixed to a metallic hub. These cylinders are bored or fixed in lines perpendicular to two diameters $g\ g'$ and $h\ h'$ at right angles to each other. In each of these cylinders pistons and piston rods P P P P slide. The outer extremity of each piston rod P P P P is rounded or has a roller attached so as to slide or roll easily against the inner surface of the curved way or guide F F.

At the bottom or inner extremity of each cylinder is a small circular opening or passage O. This opening communicates by a corresponding passage through the disk or hub D with an opening SP in the fixed steam plate SC. The steam enters through the steam plate or chest at SP and as the apertures O at the base of each cylinder successively pass the opening SP, the steam enters through the passage O into the respective cylinders. The entering steam pressing upon the piston and upon the base of the cylinder these are forced apart and as the motion of the extremity of the piston rod P is resisted by the inner surface of the curved guide, the pressure of steam against the base of the cylinder causes the base of the cylinder to recede from the piston and thus forces the disk or hub D to revolve upon the axis M in the direction of the dark arrows.

The outer extremity P of each piston rod slides upon the curved way A A A A. The surface A A A A I prefer to make in the form of an involute curve it may be made circular however. I place the axle or shaft M so that as each piston rod passes near to the lowest part of the curved guide there shall be just sufficient room for the piston rod to pass at that point. In order to diminish the friction of the extremity of these piston rods $p$, $p$, $p$, $p$, against the curved guide I sometimes attach a small roller as above stated to the extremity of each piston rod which rollers move around against the inner surface of the curved guide.

The action of the parts above described is as follows: The steam enters through the steam plate at SP. As each cylinder base in turn passes SP it opens a communication through the aperture O and permits the steam to enter and press against the base of each cylinder and the piston. This pressure against the cylinder base forces the cylinder to move and thus to revolve the disk or hub D. When the end of either piston rod $p$ is at point 1, the steam begins to enter through O and continues to enter until the end of the piston rod reaches the point 2, the steam then acts by its expansion until the end of the piston rod reaches 3. At that time another cylinder is receiving steam at 1 and the first cylinder begins to discharge steam through the aperture O and eduction passage E. The first cylinder continues to discharge its steam until it reaches the position 1, where it begins to receive steam again and thus is rotated, the hub or disk D. Each cylinder acts in the same way so that there are at all times two cylinders receiving steam and rotating the hub or disk and two cylinders discharging steam.

The advantages of this arrangement of four steam cylinders and a curved guide so that the motive power shall be developed by the pressure of the steam against the base of the cylinder are that the crank is dispensed with and a continuous rotary motion is obtained, and that the steam may be used expansively.

I propose, sometimes to construct my improved engine with slide valves for the admission and escape of steam, and to support my piston rod by guides and cross heads. The curved guide should be so constructed that the end of the piston rods shall bear as nearly perpendicular as possible on the inner surface of the curved guide at every point.

Having thus described my improved engine what I claim as my invention and desire to secure by Letters Patent is—

The combination of the four steam cylinders and pistons with the curved guide arranged and operating so as to produce a continuous rotary motion in the manner and for the purpose substantially as hereinbefore described.

ABRAHAM MASSON.

Witnesses:
 FRANCIS O'CONNOR,
 I. E. SHAW.